United States Patent Office 3,041,275
Patented June 26, 1962

3,041,275
HIGH TEMPERATURE EMULSION DRILLING FLUID
James L. Lummus and Duane B. Anderson, Tulsa, Okla., assignors to Pan American Petroleum Corporation, Tulsa, Okla., a corporation of Delaware
No Drawing. Filed June 22, 1959, Ser. No. 821,659
20 Claims. (Cl. 252—8.5)

This invention relates to drilling fluids. More particularly, it relates to emulsion drilling fluids of the water-in-oil type.

In U.S. Patent 2,661,334, an emulsion drilling fluid of the water-in-oil type is described. This drilling fluid has enjoyed considerable commercial success at temperatures up to about 250° F. At higher temperatures, however, the emulsion becomes unstable, particularly if low viscosity oils such as diesel fuel are used as the oil phase. The principal object of the present invention is to provide a water-in-oil emulsion drilling fluid which is stable at temperatures above 250° F., as well as at low temperatures. We have found that water-in-oil emulsion drilling fluids stable at temperatures above 250° F. can be prepared by use of a particular class of amides, which act as emulsifying agents, provided that a certain type of soap is also included to counteract the tendency of the emulsifying agent to flocculate finely divided solids, such as ground oyster shells, which may be added to reduce the rate of loss of liquids to the formation, or barite, which may be added to increase the density of the drilling fluid.

A formula for the drilling fluid should fall within the limits shown in Table I.

Table I

| Material: | Amount |
|---|---|
| Oil | 20 to 70 parts by volume of oil and water. |
| Water | 30 to 80 parts by volume of oil and water. |
| Amide | 2 to 10 lb./bbl. of drilling fluid. |
| Soap | 1 to 10 lb./bbl. of drilling fluid. |
| Filler | 0 to 600 lb./bbl. of drilling fluid. |
| Salt | 0 to saturated water phase. |
| Gilsonite | 0 to 20 lb./bbl. of drilling fluid. |

For convenience, three different measures of the amounts of ingredients have been used in Table I. The oil and water are given in terms of the parts by volume of the combined volumes of these two principal liquid ingredients. The additives, on the other hand, are given in terms of pounds per barrel of drilling fluid. The reason is that this is the basis most commonly used in the field. The amount of salt is given in terms of the amount required to saturate the aqueous phase, since this is the practical limit which varies from salt to salt. In all cases where concentrations are given in terms of pounds per barrel, a 42 gallon barrel is intended.

Considering the ingredients individually in more detail, the water can be fresh or salty. Fresh water emulsions are not as stable as salt water emulsions, and are more heat sensitive. They can be used under at least some conditions, however, so they should be considered operable.

The oil should be a mineral oil. Preferably, it should be a distilled petroleum fraction having low viscosity and high flash and fire points to avoid fire hazards. Diesel fuel and kerosene are suitable materials. Many light crude oils can be used if necessary. They should be avoided if possible, however, to avoid the natural emulsifiers, viscosity-increasing agents and fire hazard characteristic of most crude oils. In any case, a small pilot batch of drilling fluid should be prepared with any oil of questionable utility, and the properties of the drilling fluid measured before preparation of a large batch of drilling fluid to be used commercially.

The amide is the oil-soluble water-in-oil emulsifier. Several surface-active agents, including several types of amides, are available which form good water-in-oil emulsion drilling fluids at low temperatures. If the mud is to be used at high temperatures, however, only a specific type of oil-soluble amides can be used. To determine the limit of the class of operable amides, emulsion drilling fluids were prepared having the composition shown in Table II.

Table II

| Ingredient | Amount | |
|---|---|---|
| | Laboratory basis | Field basis |
| Oil | 158 cc | 45 parts. |
| Water | 192 cc | 55 parts. |
| Emulsifier | 3 g | 2.5 lb./bbl. |
| Deflocculant | 2 g | 1.6 lb./bbl. |
| Ground oyster shells | 18 g | 14.7 lb./bbl. |
| Barite | 250 g | 204 lb./bbl. |
| Calcium chloride | 16 g | 80,000 p.p.m. in water. |

In this composition, only the emulsifier was changed from test to test to permit a direct comparison of results. The deflocculating agent in all cases was a mixture of a glycol solvent and a triglyceride partially saponified by potassium hydroxide and is described later in more detail. The other ingredients are self-explanatory. The emulsions were prepared by first mixing the oil, emulsifier, deflocculant and ground oyster shells in a high-speed mixer, then mixing in the water containing the dissolved salt and finally adding the barite. The mixture was stirred for about 20 minutes on a Hamilton-Beach mixer before adding the barite, and about one hour after the barite was added. The properties of the various compositions before and after heating for 18 hours at 350° F., are shown in Table III. The fluid loss values were determined by the standard A.P.I. method. The plastic viscosities and yield values were determined by a multi-speed Fann viscosimeter as described in the article, "Meter Aids Exact Mud Control," by J. C. Melrose and W. B. Lillenthal, on page 136 of the July 1, 1952, issue of World Oil. To test thermal stability the samples were placed in an oven in sealed brass cylinders 2½ inches in diameter and 3¼ inches deep. The fluid loss and viscosity values given in Table III and other tables for drilling fluids after heating were measured after the drilling fluids had been cooled to about 80° F. and mixed in a high-speed mixer for about 10 or 20 minutes. The changes indicated thus represent permanent changes in the properties of the emulsion rather than temporary thermal effects.

Table III

| Test No. | Emulsifier | Plastic viscosity, cps. Before | Plastic viscosity, cps. After | Yield value, lb./100 sq. ft. Before | Yield value, lb./100 sq. ft. After | Fluid loss, cc./30 mins. Before | Fluid loss, cc./30 mins. After |
|---|---|---|---|---|---|---|---|
| 1 | Hydroxybutyramide of amine from oleic acid | 64 | 50 | 22 | 18 | 1.0 | 3.0 |
| 2 | Hydroxybutyramide of amine from soy acids | 80 | 61 | 32 | 14 | 2.2 | 4.5 |
| 3 | Hydroxybutyramide of distilled amine from soy acids | 67 | 56 | 24 | 17 | 1.0 | 2.9 |
| 4 | Hydroxybutyramide of hydrogenated amine from tallow acids | 157 | 174 | 107 | 105 | 12.7 | 25.2 |
| 5 | Hydroxybutyramide of distilled amine from tallow acids | 153 | 126 | 95 | 73 | 2.4 | 3.5 |
| 6 | Monohydroxybutyramide of N-tallow trimethylene diamine | 127 | 160 | 71 | 91 | 1.2 | 3.5 |
| 7 | Dihydroxybutyramide of N-tallow trimethylene diamine | 136 | 136 | 78 | 78 | 3.2 | 5.0 |
| 8 | Hydroxybutyramide of 90% laurylamine | 200 | 116 | 145 | 74 | 20.0 | 8.0 |
| 9 | Hydroxyvaleramide of amine from soy acids | 168 | 130 | 96 | 73 | 4.5 | 3.0 |
| 10 | Hydroxybutyramide of abietyl amine | ¹84 | | ¹54 | | ¹120 | |
| 11 | Amide of fatty acid and alkanolamine | 61 | 30 | 19 | 70 | 1.2 | 174 |
| 12 | Commercially available hydroxybutyramide of amine from soy acids | 75 | 55 | 32 | 17 | 1.3 | 1.8 |

¹ Properties before the barite was added.

The amides in all cases, except in Tests 9 and 11, were prepared by mixing gamma butyrolactone with the amine and heating to about 200° C. under reflux for about two to six hours while bubbling nitrogen through the mixture to avoid oxidation. The amide used in Test 9 was obtained in the same manner, substituting gamma valerolactone for the butyrolactone. The amide used in Test 11 was a commercially available surface active agent purchased from a chemical supply company.

Some explanation of the description of amines in the table seems advisable. Most of these were commercially available amines derived from various fatty acids. Therefore, they contained the usual mixture of saturated and unsaturated hydrocarbon radicals present in the acids, but each hydrocarbon radical had a terminal amino group instead of the usual carboxylic acid group. The N-tallow trimethylene diamine had the general formula $$RNH(CH_2)_3NH_2$$

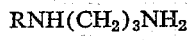

in which R represents the hydrocarbon radicals derived from tallow acids containing principally 16 or 18 carbon atoms per radical. The nature of the fatty acid and the alkanolamine group in the amine of Test 11 are not exactly known. While reference is made herein to an amide, it will be underood that a single amide or mixture of amides is intended. For example, in Test 2 the amide was actually a mixture of hydroxybutyramides of amines derived from soy bean oil.

Data in Table III show that even the tallow acids contain a sufficient number of unsaturated hydrocarbon radicals to form amides operable for our purposes, although the more highly unsaturated hydrocarbon radicals are preferred. Test 9 shows that amides of gamma hydroxycarboxylic acids other than gamma hydroxybutyric are operable. Test 10 demonstrates that amides of cyclic amines, such as the rosin amines, are not operable, so the class of amides should be limited to those having unsaturated aliphatic hydrocarbon radicals. The emulsion in Test 10 had such poor properties that no weighting agent was added. Test 11 shows that, even though an amide has a long hydrocarbon radical, an amide linkage and a hydroxyl group, it may not be operable. Apparently, the amide must be of a long chain amine and a short chain hydroxycarboxylic acid.

A possible explanation of the results of Test 11 is that while the amides of Tests 1 to 10 can form the cyclic amides known as lactams, the amide of Test 11 cannot. In making the amides of Tests 1 to 10, the reaction was stopped when production of water began. The fact that water was not at first produced seems to indicate that the first reaction consisted of opening the lactone ring and forming the hydroxybutyramide. The fact that water began to form after the first reaction was well along toward completion, indicates that formation of the lactam, with accompanying loss of water, probably occurred at elevated temperatures. In the emulsion drilling fluids at high temperatures, the only effect on the emulsifying agent may have been the formation of the cyclic lactam, which seems to be a very stable material. In the case of the amide which did not form the lactam, however, decomposition seems to have occurred. While the above theory may serve to explain the unique function of our class of amides, we do not, of course, wish to be bound by the theory.

Considering all the above observations, it would seem that the amine portion of the amide should contain an unsaturated aliphatic hydrocarbon radical. This radical should contain at least about 12 carbon atoms in order to provide adequate surface active properties. The radical preferably should not contain more than about 20 or 22 carbon atoms to avoid solubility difficulties. The acid portion of the amide should be a gamma hydroxycarboxylic acid. This means the acid must contain at least 4 carbon atoms. The hydroxyvaleramide was operable, but the relatively poor fluid loss properties of the drilling fluid employing this emulsifier show that if the acid contained many more carbon atoms, the water-solubility of this portion of the amide would be seriously upset. Therefore, for best results, the acid should contain not more than about 6 carbon atoms. This means the emulsifier should be the amide formed from an amine having unsaturated aliphathic hydrocarbon radical containing from about 12 to about 22 carbon atoms per radical, and a gamma hydroxycarboxylic acid containing from 4 to about 6 carbon atoms per molecule.

As previously noted, the particular type of amides just described are excellent emulsifiers, but have the very undesirable property of flocculating finely divided solids in the emulsion. If, for example, the deflocculant is omitted from the formula given in Table II, the ground oyster shells will settle rather rapidly from the unweighted mud. When the barite is added and stirred it does not adequately disperse in a deflocculant-free composition and also settles rapidly in large flocculent masses. We have found that this flocculation can be prevented by adding certain soaps to the composition. Table IV presents the results of tests of emulsion drilling fluids prepared using the formula given in Table II, except using various soaps. In all these tests, the emulsifier was a commercially available amide, which was the hydroxybutyramide of unsaturated amines derived from soy bean oil. The heating conditions were the same as in the tests of Table III, 18 hours at 350° F.

*Table IV*

| Test No. | Defloculant | | Properties before and after heating | | | | | |
|---|---|---|---|---|---|---|---|---|
| | | | Plastic viscosity, cps. | | Yield value, lb./100 sq. ft. | | Fluid loss, cc./30 mins. | |
| | Type | Lb./bbl. | Before | After | Before | After | Before | After |
| 1 | Additive B | 2 | 170 | 165 | 98 | 95 | 2.0 | 4.0 |
| 2 | Sodium resinate | 1.4 | 148 | 73 | 84 | 41 | 1.5 | 2.9 |
|   | Isopropanol | 0.6 | | | | | | |
| 3 | Potasium oleate | 2.0 | 141 | 48 | 87 | 87 | 0.0 | 8.1 |
| 4 | Potassium oleate | 2.0 | 226 | 184 | 144 | 140 | 1.5 | 34.0 |
|   | Isopropanol | 0.8 | | | | | | |
| 5 | Sodium oleate | 2.0 | 194 | 48 | 121 | 84 | 1.0 | 17.2 |
| 6 | Sodium oleate | 2.0 | 186 | 208 | 110 | 159 | 0.9 | 19.0 |
|   | Isopropanol | 0.8 | | | | | | |
| 7 | Aluminum oleate | 2.0 | 76 | (1) | 74 | (1) | 1.8 | (1) |
| 8 | Aluminum oleate | 1.5 | 170 | 205 | 108 | 140 | 1.9 | 3.6 |
|   | Isopropanol | 0.8 | | | | | | |
| 9 | Aluminum stearate | 2.0 | Barite flocculated | | | | | |
| 10 | Calcium stearate | 2.0 | Barite flocculated | | | | | |
| 11 | Zinc stearate | 2.0 | Barite flocculated | | | | | |

[1] Emulsion broke.

Additive B is one of our preferred forms of soap. This form is described in more detail in U.S. Patent 2,207,256 issued to Roland Kapp. It is a mixture of a glycol such as diethylene glycol, and a triglyceride, such as a natural vegetable or animal oil or fat, partially saponified with KOH. In the partial saponification, enough KOH is used to react with from 1 to 2 of the acid groups of the triglyceride. Thus, the mole ratio of potassium soap to partially degraded triglyceride may vary between 1 to 1 and 2 to 1.

A comparison of the resutls of Test 1 in Table IV with Test 12 in Table III, shows that the properties of the two emulsion drilling fluid samples containing identical ingredients have widely different properties. The reason lies in the different methods of preparation. The compositions in Table III were prepared by mixing together the oil, emulsifier, deflocculant and ground oyster shells, dissolving the salt in the water, mixing the water and oil solutions and, finally, adding the barite. Compositions in Table IV were prepared in the same way, except that the deflocculant was added last. Thus, in the second method of preparation the barite and ground oyster shells in the emulsion were in a flocculated condition before the deflocculant was added. It is much easier for an agent to prevent flocculation of finely divided solid particles than it is to separate the flocks into separate particles after flocculation has occurred. This explains the difference in properties of emulsion muds made by the two different methods. The method used in preparing the compositions of Table IV provided a much more severe test of the deflocculating agents and thus permitted showing a better distinction between the agents. For the same reason, no gilsonite was added to the compositions to reduce the fluid loss. As a result, the fluid loss values after heating in Tests 3, 4, 5 and 6 were much higher than when gilsonite is present and should be regarded as significant only in showing the unusual stability of the compositions of Tests 1, 2 and 8, even in the absence of gilsonite.

The sodium resinate used in Test 2 was not oil dispersible in the absence of alcohol. Therefore, it could not act as a deflocculant of materials in the oil phase. When mixed with alcohol prior to addition to the oil, however, it became sufficiently dispersible in oil to act as one of the best deflocculating agents tested. The stearates used in Tests 9, 10 and 11, on the other hand, were too oil-soluble. The results of wetting potassium and sodium oleates with alcohol, as shown in Tests 4 and 6, again demonstrate the adverse effects of too much oil-solubility, but at the same time show that operable drilling fluids can be prepared using soaps having a rather wide variation of oil-dispersibility. The sodium resinate results, however, show that a soap may be too oil-insoluble and the results with stearates show a soap may be too oil-soluble. The results with aluminum oleate are not well understood but, again, an adjustment of solubility of this soap by addition of a little alcohol corrected the difficulties and produced an emulsion drilling fluid of excellent properties.

The simplest way to place a limit on the oil-solubility of a soap is to say that it is water soluble, since soaps which are too oil-soluble are not naturally water-soluble. By naturally water-soluble, we mean soluble in water in the absence of a solubilizing agent such as an alcohol. Water solubility is indicated by an increase in viscosity of water when the soap is stirred into the water. It will be apparent that all naturally water-soluble soaps, such as sodium resinate, are not naturally sufficiently oil-dispersible. By addition of an alcohol or other solubilizing agent, however, such soaps can be converted into an oil-dispersible form. Thus, the soap should be naturally water-soluble and in an oil-dispersible form. Whether the soap is sufficiently oil-dispersible is best determined by preparing the composition of Table II, using the particular soap. If it prevents flocculation of the barite, then it is sufficiently oil-dispersible.

While the term, "soap" ordinarily means a metallic salt of a fatty acid, it will be apparent that other acids may be employed. Rosin acids, for example, may be used. Other acids, such as naphthenic and sulfonic acids will occur to those skilled in the art, the carboxylic acids being preferred. Such acids ordinarily contain at least about 12 carbon atoms per molecule, and these are preferred. Acids having a smaller number of carbon atoms per molecule may also be used, however, if they are naturally water-soluble and are in an oil-dispersible form as described above. The preferred soaps for our purposes are alkali metal soaps of unsaturated carboxylic acids containing from about 12 to about 20 carbon atoms per molecule. When the term "soap" is used, it will be understood that either a single soap or a mixture of soaps is intended.

The filler may be any of several materials. Preferably, it is a solid, not hydratable by water. Examples of such materials are ground oyster shells and barite, which can serve the double function of decreasing the fluid loss and increasing the density of the drilling fluid. Table V presents data on drilling fluids prepared in accordance with the composition of Table II, except using different fillers. The emulsifier in every case was the one described in Test 12 of Table III. The deflocculant was the one used in Test 1 of Table IV.

Table V

| Test No. | Filler | Drilling fluid properties | | | |
|---|---|---|---|---|---|
| | | Stormer viscosity, cps. | | Fluid loss, cc./30 mins. | |
| | | Before | After | Before | After |
| 1 | Ground oyster shells | 75 | 72 | 1.0 | 2.0 |
| 2 | Clay A | 73 | 90 | 7.8 | 29.0 |
| 3 | Clay B | 75 | 103 | 2.7 | 17.0 |
| 4 | Clay C | 101 | 300+ | 2.0 | 43.9 |
| 5 | Barite | 62 | | 3.6 | |
| 6 | Ground oyster shells Cherokee shale [1] | 121 | 180 | 0.5 | 1.8 |

[1] Hydratable shale from the Cherokee formation in western Oklahoma. Added 80 pounds of shale per barrel of drilling fluid after emulsion was prepared.

The viscosities were measured in this series of tests by means of a Stormer viscosimeter rotating at 600 r.p.m., as described in A.P.I. Recommended Procedure 29.

Clays A, B and C were so-called low yield clays. That is, large amounts must be added to water to cause substantial increases in viscosity and gel strength. They are only mildy hydratable materials. In this connection the term "unhydratable solid" means a solid which does not substantially increase the viscosity and gel strength of water. Clay C was by far the most easily hydrated clay of the three. The increased viscosities and fluid loss rates of the drilling fluids after heating indicate that the clays were becoming hydrated and were seriously changing the emulsion properties. There was, therefore, some concern regarding what would happen if the drilling fluid was used at high temperatures to drill hydratable shales. Test 6 shows the results of adding a hydratable shale to the emulsion drilling fluid and then heating the drilling fluid. Only a moderate increase in viscosity occurred in spite of the large amount of shale present. Large pieces of shale were still visible after heating and after re-mixing with a high-speed stirrer. All this shows that the shale was not seriously hydrated in spite of the fact that it is at least as easily hydrated as clay C in Test 4. The low fluid loss of the drilling fluid in Test 6 after heating shows the emulsion was only slightly changed, again indicating that the shale was not hydrated.

The explanation of the difference in results in Tests 4 and 6 lies in the method of preparing the drilling fluid. In Tests 1 to 5, the filler was stirred into the oil together with the emulsifier and deflocculating agent before these materials were mixed with the salt water. In Test 6, the hydratable shale was mixed into the drilling fluid after the emulsion had been formed. It has been previously noted that many emulsions, particularly those of the water-in-oil type, are characterized by a tough, semi-solid film surrounding the droplets of the disperse phase. This film is quite effective in preventing passage of some materials from one phase of the emulsion to the other. It is apparent that in Test 6, the film was sufficiently strong to prevent serious contact between the hydratable shale and the water phase. In Tests 2 to 4, however, the clays had an opportunity to contact the water phase while the water and oil were being mixed together to form the emulsion; that is, while the emulsifying film was forming. The contact was obviously sufficient to cause considerable hydration of the clay.

The results of Tests 1 and 5 indicate that unhydratable solids, such as ground oyster shells, barite, gilsonite and the like, can be added to the oil before it is mixed with the water to form the emulsion. The other tests show that hydratable solids, such as clays, may also be used as fillers to reduce fluid loss, but these materials should be added only after the oil and water have been mixed together to form the emulsion.

The particle size of the solid filler material may fall within a wide range of sizes and still product some reduction in filter loss rates. Preferably, however, the particles should be distributed throughout the range from particles barely passing a number 30 U.S. standard sieve to those barely retained on a number 325 sieve. Such a range is frequently referred to as a −30 to +325 mesh range.

Several drilling fluids were prepared using the composition shown in Table II, except that other salts were substituted for calcium chloride. The results are shown in Table VI.

Table VI

| Test No. | Salt | Properties of drilling fluids before and after heating | | | | | | | |
|---|---|---|---|---|---|---|---|---|---|
| | | Stormer, visc./cps. | | Plastic viscosity, cps. | | Yield value, lb./100 sq. ft. | | Fluid loss, cc./30 min. | |
| | | Before | After | Before | After | Before | After | Before | After |
| 1 | NaCl | 83 | 87 | 53 | 47 | 24 | 30 | 1.0 | 4.1 |
| 2 | KCl | 79 | 55 | 54 | 32 | 18 | 25 | 0.9 | 22.0 |
| 3 | KCl [a] | | 55 | | 30 | | 21 | | 12.2 |
| 4 | KCl Ca Cl₂ [b] | | 83 | | 35 | | 39 | | 3.6 |
| 5 | Al₂(SO₄)₃ | 80 | 83 | 65 | 32 | 22 | 47 | 1.0 | 92.5 |
| 6 | Al₂(SO₄)₃ CaCl₂ [b] | | 160 | | 54 | | 74 | | 15.4 |

[a] Drilling fluid from Test 2 after heating stirred an additional 10 minutes on high-speed mixer.
[b] CaCl₂ added to previously heated and tested drilling fluid and stirred an additional 10 minutes on high speed mixer.

The data in Table VI show that many salts can be substituted for calcium chloride in the aqueous phase of the emulsion with few changes in properties of the drilling fluid at low temperatures. If the drilling fluids are subjected to higher temperatures, however, it will be apparent that the emulsion properties are changed to such a degree that high fluid losses may result. A comparsion of Tests 2 and 3 shows that vigorous stirring partially restores the low fluid loss of emulsions containing potassium chloride. Test 4 shows that the addition of solid calcium chloride to the drilling fluid from Test 2, followed by mixing, aids even more in restoring the low fluid loss properties. A comparison of Tests 5 and 6 shows this same beneficial effect of calcium chloride and demonstrates the unique action of this specific salt. The ability to treat with calcium chloride is important in case salt water flows into the drilling fluid in the well from high pressure brine-containing formations. Some of the salts in the brine may have bad effects on the drilling fluid. The results of Tests 4 and 6 show these bad effects can be at least partially overcome by the addition of calcium chloride to the drilling fluid or, preferably, by including calcium chloride in the original drilling fluid composition. While sodium chloride does not seem to have harmful effects on the drilling fluid, it does not have the ability of calcium chloride to overcome bad effects of other salts.

Some salts, such as aluminum sulfate, tend to cause a slight flocculation of the barite, ground oyster shells and the like. This action is particularly strong in the case of ammonium salts such as ammonium sulfate. The flocculating action can be overcome to a large degree by the addition of a higher concentration of the deflocculating soap. This flocculation action of some salts can be even more completely overcome by the addition of calcium chloride to the drilling fluid. This makes possible the use of salts, such as ammonium sulfate, for special purposes such as their ability to prevent hydration of shales by the aqueous phase of the drilling fluid filtrate.

As previously noted, the fluid loss values of drilling fluids after heating, as presented in Tables III, IV and V, were measured after the drilling fluid had been cooled to about 80° F. and re-mixed. This gives an idea of any permanent changes in the emulsion but does not indicate what the fluid loss of the drilling fluid was at elevated temperatures. High temperature fluid loss values were determined by use of equipment described by F. W. Schremp and V. L. Johnson in the article entitled, "Drilling Fluid Filter Loss at High Temperatures and Pressures," appearing in the June 1952 issue of the Journal of Petroleum Technology, p. 157. This equipment is a filter cell in a hot air bath. Using this equipment, the data appearing in Table VII were obtained. The compositions were as shown in Table II, except for use of the additives indicated.

*Table VII*

| Test No. | Additive | | Temperature of Test, °F. | Fluid loss, cc./30 min. |
|---|---|---|---|---|
| | Type | Lb./bbl. | | |
| 1 | None | | 275 | 71.0 |
| 2 | Petroleum resin [1] | 10 | 300 | 2.55 |
| 3 | do.[1] | 10 | 325 | 15.6 |
| 4 | do.[1] | 10 | 360 | ([2]) |
| 5 | Gilsonite [3] | 10 | 300 | 0.7 |
| 6 | do.[3] | 10 | 350 | 0.2 |

[1] The solid material remaining in asphaltic residual from petroleum after precipitation of asphalt with pentane. Softening point 330° F.
[2] Too great to measure.
[3] Softening point 340° F.

From the data in Table VII, it will be apparent that while high melting petroleum resins are operable for our purposes in reducing high temperature fluid loss of our drilling fluid, the natural solid asphaltic minerals, such as gilsonite, are somewhat superior. Other natural asphaltic minerals, such as elaterite, manjak, glance pitch and grahamite will be apparent to those skilled in the art. These are operative for our purposes if they have high softening points; that is, softening points at least about as high as the temperature to which the drilling fluid is to be subjected. The softening point of the organic petroleum residue should be above about 250° F. since the fluid loss of the drilling fluid does not become excessive until a temperature in this range is reached. All of these solid organic asphaltic and resinous petroleum residues should be ground to pass about a number 80 sieve in order that they can be easily suspended in the drilling fluid. These materials seem to perform their function by softening slightly and deforming under pressure to seal openings in the formations through which the drilling fluid is being lost. This seems to explain why particle size does not appear to be particularly important. The particles should not be much smaller than 325 mesh in size, however. This is because such small particles tend to increase the drilling fluid viscosity and also because they tend to dissolve more readily in the oil at elevated temperatures.

The nature of the various ingredients of our emulsion mud have been discussed above. The following examples of drilling fluids will provide information on concentrations which should be used. Two drilling fluids containing the following ingredients were prepared and their properties were measured to determine limits of oil and water contents.

| | A | B |
|---|---|---|
| Diesel oil, parts per volume of liquids | 70 | 20 |
| Amide,[1] lb./bbl | 2.7 | 2.7 |
| Soap,[2] lb./bbl | 1.6 | 1.6 |
| Ground oyster shells, lb./bbl | 14.7 | 14.7 |
| Water, parts per volume of liquids | 30 | 80 |
| Calcium chloride, lb./bbl | 12.8 | 12.8 |
| Barite, lb./bbl | 250 | 250 |

[1] Hydroxybutyramides of soy amines.
[2] Glycol and triglyceride partially saponified with KOH.

Composition A was not sufficiently viscous to support the solids, so these solids settled out in a short time. When two pounds per barrel of a paint pigment suspending agent were added, however, the solids did not settle seriously. Composition B was a very viscous water-in-oil emulsion which might be pumped in a shallow well, but with difficulty. From the properties of Compositions A and B, it will be apparent that the volumes of oil and water should be from about 70 to 20 and about 30 to 80, respectively. Preferably the ranges should be from about 60 to 30 and about 40 to 70, respectively.

A composition containing the following ingredients, including only 1 pound of the amide per barrel of drilling fluid, was prepared and tested with the results shown. The heating test was the usual one of 18 hours at 350° F.

Diesel oil _____ cc__ 158
Hydroxybutyramides of soy amines _____ grams__ 1
Commercial lecithin _____ do____ 2
Water _____ cc__ 192
Calcium chloride _____ grams__ 16
Ground limestone _____ do____ 18
Ethoxylated tall oil _____ do____ 1
Barite _____ do____ 250

| | Before heat | After heat |
|---|---|---|
| Stormer viscosity, centipoises | 56 | 61. |
| Fluid loss, cc | 0.5 in 90 mins | 60 in 10 mins. |

While the drilling fluid had excellent properties at low temperatures, it will be apparent that a higher concentration of the amide is required if high-temperature stability is to be obtained. This is in spite of the presence of lecithin and ethoxylated tall oil, which should give some emulsion stability even at 350° F. A minimum amide concentration of about 2 pounds per barrel is recommended in view of the properties of this drilling fluid. Amide concentrations up to 5 or 6 pounds per barrel give excellent results. Even higher concentrations can be used if desired. Economic considerations ordinarily limit the amide concentration to a value of about 10 pounds per barrel.

The following composition was prepared, the properties of which are pertinent to the lower limit of concentration of the soap.

Diesel oil _____ cc__ 158
Hydroxybutyramide of soy amines _____ grams__ 2
Water _____ cc__ 192
Calcium chloride _____ grams__ 16
Ground oyster shells _____ do____ 18
Ethoxylated tall oil _____ do____ 1

The ground oyster shells flocculated. When 250 grams of barite were added, this material also flocculated. The addition of only 1 gram of a mixture of glycol and triglyceride partially saponified by KOH deflocculated the solids. Properties of the resulting drilling fluid before and after heating for 18 hours at 350° F. were as follows:

|  | Before | After |
|---|---|---|
| Stormer viscosity, centipoises | 92 | 81 |
| Fluid loss, cc./30 min | 1.5 | 6.0 |

From these properties, it will be apparent that as little as 1 pound of soap and 2 pounds of the amide per barrel of drilling fluid will produce a drilling fluid with acceptable properties before and after heating. There seems to be no particular upper limit on the concentration of soap, except that it should not greatly exceed the quantity of amide present in the emulsion. If too much more soap than amide is used, the emulsion may tend to invert to an oil-in-water form with consequent loss of acceptable drilling fluid properties.

A drilling fluid was heavily weighted with barite to determine the upper limit of solids which the emulsion could carry. In our drilling fluid, the barite was dispersed in the oil phase. Therefore, in the heavily weighted composition, the oil-to-water ratio was increased to provide a larger volume of oil to carry the barite. The composition of a drilling fluid is given below, together with the properties before and after heating for 18 hours at 350° F.:

|  | Laboratory basis | Field basis |
|---|---|---|
| Diesel oil | 225 cc | 64 parts by volume. |
| Hydroxybutyramide of soy amines | 6 grams | 3.5 lb./bbl. |
| Soap [1] | 3 grams | 1.8 lb./bbl. |
| Ground limestone | 27 grams | 16 lb./bbl. |
| Hydrogenated castor oil [2] | 2 grams | 1.2 lb./bbl. |
| Water | 125 cc | 36 parts by volume. |
| Calcium chloride | 16 grams | 110 p.p.m. of water. |
| Barite | 900 grams | 530 lb./bbl. |

[1] Glycol and triglyceride partially saponified with KOH.
[2] Dissolved in mineral spirits with polyethylene.

|  | Before heat | After heat |
|---|---|---|
| Stormer viscosity, centipoises | 258 | 227 |
| Fluid loss, cc./30 min | 2.5 | 3.3 |
| Density, lb./gal | 18.05 |  |

It will be apparent that this composition containing about 550 pounds of solids per barrel of drilling fluid had acceptable properties. It will also be apparent, however, that not much more solids could be added until the viscosity would become excessive. Preferably, at least about 10 pounds of solids per barrel of drilling fluid should be used to decrease the loss of fluids to permeable formations. The hydrogenated castor oil was added to assist in suspending the large amount of solids in the emulsion.

The quantity of salt varies from none at all to an amount necessary to saturate the aqueous phase. Any salt in excess of that required to saturate the water acts in the same manner as other undissolved solids, such as ground limestone. A drilling fluid composition containing no salt, and the properties of the drilling fluid before and after heating are presented below:

| Diesel oil | cc | 158 |
|---|---|---|
| Hydroxybutyramides of soy amines | grams | 3 |
| Soap [1] | do | 2 |
| Ground oyster shells | do | 18 |
| Water | cc | 192 |
| Barite | grams | 250 |

[1] Glycol and triglyceride partially saponified with KOH.

|  | Before heat | After heat |
|---|---|---|
| Stormer viscosity, centipoises | 74 | 82 |
| Plastic viscosity, centipoises | 51 | 54 |
| Yield value, lb./100 sq. ft | 14 | 13 |
| Fluid loss, cc./30 min | 0.9 | 5.1 |

It will be apparent that the drilling fluid has operable properties in the absence of salts. Preferably, however, between about 5 and about 50 pounds of calcium chloride should be present to counteract the possible adverse effects of other salts.

As noted in connection with Table VII, if no solid organic petroleum residue is present, the fluid loss of the drilling fluid at temperatures above about 250° F. becomes excessive. Any amount of gilsonite or similar solid material will decrease the fluid loss and will permit use of the drilling fluid at higher temperatures. A drilling fluid containing 18 pounds of gilsonite per barrel of drilling fluid was prepared and its properties were tested before and after heating. The composition and properties were as follows:

| Diesel oil | cc | 158 |
|---|---|---|
| Hydroxybutyramides of soy amines | grams | 3 |
| Soap [1] | do | 2 |
| Gilsonite | do | 18 |
| Water | cc | 192 |
| Calcium chloride | grams | 16 |
| Barite | do | 250 |

[1] Glycol and triglyceride partially saponified with KOH.

|  | Before heat | After heat |
|---|---|---|
| Stormer viscosity, centipoises | 300+ | 156 |
| Plastic viscosity, centipoises |  | 77 |
| Yield value, lb./100 sq. ft |  | 49 |
| Fluid loss cc./30 min | 0.0 | 0.0 |

The gilsonite which was used in this composition passed a number 200 sieve and was retained on a number 325 sieve. It will be apparent that this finely divided gilsonite should be added in small quantities to avoid excessive viscosities. It will also be apparent, however, that after subjecting the gilsonite-containing fluid to high temperature, the viscosity decreased. This is thought to be due to slight agglomeration of the small particles, and possibly adherence to the barite particles. In any case, it will be apparent that when using a drilling fluid at high temperature, it will be best to add small quantities of gilsonite intermittently, and allow them to be subjected to high temperature before more gilsonite is added. In this way, a concentration of as much as about 20 pounds of gilsonite per barrel of drilling fluid can be obtained without developing excessive viscosity. Preferably, the concentration of gilsonite should be between about 5 and about 15 pounds per barrel of drilling fluid.

As previously noted, the properties of the emulsion drilling fluid depend to some degree on the order in which the ingredients are mixed together. The best properties can ordinarily be produced by first dissolving the amide and dispersing the soap in the oil phase, dissolving the salt in the water phase, mixing the two solutions together and finally adding the finely divided solids.

For the sake of convenience, it is possible to form a dry concentrate of the amide and the soap by mixing them with a finely divided unhydratable solid, such as ground oyster shells. For example, about 3 parts by weight of the amide, about 2 parts by weight of the soap, and about 20 parts by weight of ground oyster shells makes a suitable dry concentrate. This dry concentrate can be mixed into the oil, the salt dissolved in the water, and the two phases mixed together after which any additional solids, such as gilsonite or barite can be added. The dry concentrate may also include the water-soluble salt if desired. In this case, the concentrate is first dispersed in the oil and then fresh water is added and stirred vigorously before any other solids are added. Preferably, however, the salt should be omitted from the dry concentrate and should be dissolved in the water before the water and oil are mixed together. The dry concentrate may also include the petroleum residue such as gilsonite.

A liquid concentrate can also be prepared by dissolving the amide and dispersing the soap in a small volume of oil. If alcohol is used to wet the soap, this liquid alone may sometimes be sufficient to form a usable paste of the amide and soap. Preferably, however, a volume of mineral oil, such as kerosene or diesel fuel, of about 1 or 2 times the combined volumes of the amide and soap should be used to form a liquid concentrate. Salts and solids should not be added to the liquid concentrate. The reason is to avoid excessive viscosities with consequent difficulty of handling and dispersing the concentrate in the oil phase of the emulsion.

Our drilling fluid has been described previously as a high-temperature emulsion drilling fluid. Like most other water-in-oil emulsion fluids, it should be used principally for completing or working-over wells where only short sections are drilled. This avoids contamination of the drilling fluid with large amounts of solids. It will be apparent, however, that our drilling fluid is also applicable to drilling operations carried out at low temperatures, and has some applicability to drilling long sections of wells. The drilling fluid may also be used in other operations such as fracturing, gun perforating or the like. Still others will occur to those skilled in the art.

We claim:

1. A composition suitable for use as a drilling fluid at high temperatures consisting essentially of from about 20 to about 70 parts by volume of a mineral oil, from about 80 to about 30 parts by volume of water, at least about 2 pounds per barrel of said composition of an amide of a gamma hydroxy carboxylic acid having from 4 to 6 carbon atoms and an aliphatic amine having an unsaturated hydrocarbon radical containing at least about 12 carbon atoms, at least about 1 pound per barrel of said composition of a soap selected from the group consisting of aluminum oleate and alkali metal soaps of organic acids containing from about 12 to about 20 carbon atoms, and said soap being in an oil-dispersible form, from 0 to about 600 pounds per barrel of said composition of a finely divided solid insoluble in said oil and said water, from 0 to about 20 pounds per barrel of said composition of a solid natural asphaltic mineral in finely divided form, and from 0 percent salt to a sufficient amount of salt to saturate the aqueous phase of said composition.

2. The composition of claim 1 in which said amide is a hydroxybutyramide, said soap is an alkali metal soap of an unsaturated carboxylic acid containing from about 12 to about 20 carbon atoms, and when a solid natural asphaltic mineral is present, said mineral is gilsonite, and when a salt is present, said salt is calcium chloride.

3. The composition of claim 1 in which said amide is a mixture of hydroxybutyramides of amines derived from soy bean oil, said soap is a mixture of one part of a glycol and 3 to 7 parts of a triglyceride partially saponified with sufficient KOH to react with from 1 to 2 of the acid groups of the triglyceride, and when a solid natural asphaltic mineral is present, said mineral is gilsonite, and when a salt is present, said salt is calcium chloride.

4. A solid concentrate suitable for use with oil and water for forming a water-in-oil emulsion drilling fluid consisting essentially of from about 2 to about 10 parts by weight of an amide of a gamma hydroxy carboxylic acid having from 4 to 6 carbon atoms and an aliphatic amine having an unsaturated hydrocarbon radical containing at least about 12 carbon atoms, from about 1 part of a soap to an amount substantially equal to the quantity of amide, said soap being selected from the group consisting of aluminum oleate and alkali metal soaps of organic acids containing from about 12 to about 20 carbon atoms, and said soap being in an oil-dispersible form, and a sufficient amount of finely divided unhydratable solid to form a dry, free-flowing powdered concentrate.

5. The concentrate of claim 4 in which said amide is a hydroxybutyramide and said soap is an alkali metal soap of an unsaturated carboxylic acid containing from about 12 to about 20 carbon atoms.

6. The concentrate of claim 4 in which said amide is a mixture of hydroxybutyramides of amines derived from soy bean oil, said soap is a mixture of one part of a glycol and 3 to 7 parts of a triglyceride partially saponified with sufficient KOH to react with from 1 to 2 of the acid groups of the triglyceride and said unhydratable solid is selected from the group consisting of ground oyster shells and barite.

7. The concentrate of claim 4 which also contains from about 5 to about 15 parts of a solid natural asphaltic mineral.

8. The concentrate of claim 7 in which said natural asphaltic mineral is gilsonite.

9. A liquid concentrate suitable for use with oil and water for preparing a water-in-oil emulsion drilling fluid consisting essentially of from about 2 to about 10 parts by weight of an amide of a gamma hydroxy carboxylic acid having from 4 to 6 carbon atoms and an aliphatic amine having an unsaturated hydrocarbon radical containing at least about 12 carbon atoms, from about 1 part of a soap to an amount substantially equal to the quantity of amide, said soap being selected from the group consisting of aluminum oleate and alkali metal soaps of organic acids containing from about 12 to about 20 carbon atoms, and said soap being in an oil-dispersible form, and a sufficient amount of a mineral oil to decrease the viscosity of the concentrate to the desired degree.

10. The concentrate of claim 9 in which said amide is a hydroxybutyramide and said soap is an alkali metal soap of an unsaturated carboxylic acid containing from about 12 to about 20 carbon atoms.

11. The concentrate of claim 9 in which said amide is a mixture of hydroxybutyramides of amines derived from soy bean oil, and said soap is a mixture of one part of a glycol and 3 to 7 parts of a triglyceride partially saponified with sufficient KOH to react with from 1 to 2 of the acid groups of the triglyceride.

12. A water-in-oil emulsion drilling fluid consisting essentially of from about 30 to about 60 parts by volume of oil, from about 40 to about 70 parts by volume of water, from about 2 to about 10 pounds per barrel of said drilling fluid of an amide of a gamma hydroxy carboxylic acid having from 4 to 6 carbon atoms and an aliphatic amine having an unsaturated hydrocarbon radical containing at least about 12 carbon atoms, from about 1 to about 10 pounds per barrel of said drilling fluid of an alkali metal soap of an unsaturated fatty acid containing from about 12 to about 20 carbon atoms, said soap being in an oil-dispersible form, from about 10 to about 600 pounds per barrel of an unhydratable finely divided solid insoluble in said oil and said water, from about 5 to about 15 pounds per barrel of a solid natural asphaltic mineral having a softening point of at least about 250° F., and from about 5 to about 50 pounds per barrel of calcium chloride.

13. The drilling fluid of claim 12 in which said amide is a mixture of hydroxybutyramides of amines derived from soy bean oil, said soap is a mixture of one part of a glycol and 3 to 7 parts of a triglyceride partially saponified with sufficient KOH to react with from 1 to 2 of the acid groups of the triglyceride, said unhydratable solid is selected from the group consisting of ground oyster shells and barite, and said natural asphaltic mineral is gilsonite.

14. In the method of drilling a well through earth formations in which method a water-in-oil emulsion drilling fluid is circulated in the well to perform the usual functions of drilling fluids, the improvement comprising using as said drilling fluid the composition of claim 1 whereby the drilling operation can be carried out in a temperature range including temperatures above that at which most water-in-oil emulsion drilling fluids lose their abilities to decrease fluid loss and provide an adequate viscosity and gel strength to sweep the bit cuttings from the well.

15. In the method of drilling a well through earth formations in which method a water-in-oil emulsion drilling fluid is circulated in the well to perform the usual functions of drilling fluids, the improvement comprising using as said drilling fluid the composition of claim 2 whereby the drilling operation can be carried out in a temperature range including temperatures above that at which most water-in-oil emulsion drilling fluids lose their abilities to decrease fluid loss and provide an adequate viscosity and gel strength to sweep the bit cuttings from the well.

16. In the method of drilling a well through earth formations in which method a water-in-oil emulsion drilling fluid is circulated in the well to perform the usual functions of drilling fluids, the improvement comprising using as said drilling fluid the composition of claim 3 whereby the drilling operation can be carried out in a temperature range including temperatures above that at which most water-in-oil emulsion drilling fluids lose their abilities to decrease fluid loss and provide an adequate viscosity and gel strength to sweep the bit cuttings from the well.

17. In the method of drilling a well through earth formations in which method a water-in-oil emulsion drilling fluid is circulated in the well to perform the usual functions of drilling fluids, the improvement comprising using as said drilling fluid the composition of claim 12 whereby the drilling operation can be carried out in a temperature range including temperatures above that at which most water-in-oil emulsion drilling fluids lose their abilities to decrease fluid loss and provide an adequate viscosity and gel strength to sweep the bit cuttings from the well.

18. In the method of drilling a well through earth formations in which method a water-in-oil emulsion drilling fluid is circulated in the well to perform the usual functions of drilling fluids, the improvement comprising using as said drilling fluid the composition of claim 13 whereby the drilling operation can be carried out in a temperature range including temperatures above that at which most water-in-oil emulsion drilling fluids lose their abilities to decrease fluid loss and provide an adequate viscosity and gel strength to sweep the bit cuttings from the well.

19. A method of preparing an emulsion drilling fluid suitable for use at high temperatures comprising dispersing into a mineral oil an amide and a soap, said amide being formed from a gamma hydroxy carboxylic acid having from 4 to 6 carbon atoms and an aliphatic amine having an usaturated hydrocarbon radical containing at least about 12 carbon atoms, said soap being selected from the group consisting of aluminum oleate and alkali metal salts of organic acids containing from about 12 to about 20 carbon atoms, and said soap being in an oil-dispersible form, dissolving a salt in water, mixing the oil dispersion and water solution to form an emulsion, and then mixing a finely divided solid into said emulsion.

20. The method of claim 19 in which said amide is a mixture of hydroxybutyramides of amines derived from soy bean oil, said soap is a mixture of one part of a glycol and 3 to 7 parts of a triglyceride partially saponified with sufficient KOH to react with from 1 to 2 of the acid groups of the triglyceride, said salt is calcium chloride, and said solid is selected from the group consisting of ground oyster shells and barite.

References Cited in the file of this patent

UNITED STATES PATENTS

| | | |
|---|---|---|
| 2,099,825 | Rolshausen et al. | Nov. 23, 1937 |
| 2,372,797 | Segessemann et al. | Apr. 3, 1945 |
| 2,400,001 | Grupelli | May 7, 1946 |
| 2,440,349 | Schaeffer | Apr. 27, 1948 |
| 2,661,334 | Lummus | Dec. 1, 1953 |
| 2,872,332 | Grifo et al. | Feb. 3, 1959 |
| 2,876,197 | Watkins | Mar. 3, 1959 |